(12) United States Patent
Ahn et al.

(10) Patent No.: US 10,979,123 B2
(45) Date of Patent: Apr. 13, 2021

(54) APPARATUS AND METHOD FOR GENERATING AND TRANSMITTING CQI IN A WIRELESS NETWORK

(71) Applicant: Samsung Electronics Co., Ltd., Suwon-si (KR)

(72) Inventors: Seokki Ahn, Suwon-si (KR);
Kwangtaik Kim, Yongin-si (KR);
Yongseok Kim, Suwon-si (KR);
Chiwoo Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 109 days.

(21) Appl. No.: 15/806,132

(22) Filed: Nov. 7, 2017

(65) Prior Publication Data
US 2018/0138960 A1 May 17, 2018

(30) Foreign Application Priority Data

Nov. 15, 2016 (KR) .................. 10-2016-0151732

(51) Int. Cl.
*H04B 7/06* (2006.01)
*H04L 1/00* (2006.01)
(Continued)

(52) U.S. Cl.
CPC ......... *H04B 7/0632* (2013.01); *H04B 7/0408* (2013.01); *H04B 7/0452* (2013.01);
(Continued)

(58) Field of Classification Search
CPC .... H04B 3/487; H04B 7/0632; H04B 7/0452; H04W 88/025; H04J 11/0023; H04J 11/0063
See application file for complete search history.

(56) References Cited

U.S. PATENT DOCUMENTS 9,078,151 B2 7/2015 Lee et al.
9,148,207 B1 9/2015 Sun et al.
(Continued)

FOREIGN PATENT DOCUMENTS

EP 2852238 A1 3/2015
WO 2016054069 A1 4/2016

OTHER PUBLICATIONS

Kim etal, "Adaptive Sliding-Window Coded Modulation in Cellular Networks", IEEE 2015 (Year: 2015).*
(Continued)

*Primary Examiner* — Omer S Mian

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

According to various embodiments of the present disclosure, a CQI transmission method of a terminal in a wireless communication system includes: estimating a channel of a serving base station and an interference base station to which sliding-window superposition coding (SWSC) is applied; generating channel quality information (CQI)-related information on the serving base station and the interference base station based on the estimated channel to indicate an achievable rate region; and transmitting the generated CQI-related information. However, the present disclosure is not limited to the above embodiment, and therefore other embodiments are possible.

16 Claims, 22 Drawing Sheets

(51) Int. Cl.
H04B 7/0452 (2017.01)
H04B 7/0408 (2017.01)
H04L 5/00 (2006.01)

(52) U.S. Cl.
CPC .............. *H04L 1/00* (2013.01); *H04L 1/0026* (2013.01); *H04L 1/0048* (2013.01); *H04L 5/0032* (2013.01)

(56) References Cited

U.S. PATENT DOCUMENTS

2014/0135028 A1* 5/2014 Wang ................ H04W 72/1205
455/452.2
2014/0146756 A1* 5/2014 Sahin .................... H04L 1/0025
370/329
2016/0277218 A1* 9/2016 Jongren ................ H04L 5/0091
2016/0285656 A1 9/2016 Kim et al.
2017/0294981 A1* 10/2017 Kim .......................... H04L 1/06

OTHER PUBLICATIONS

Wang et al, "Sliding-Window Superposition Coding for Interference Networks", IEEE (Year: 2014).*
International Search Report regarding International Application No. PCT/KR2017/012217, dated Feb. 2, 2018, 3 pages.
Kim et al., "Adaptive Sliding-Window Coded Modulation in Cellular Networks", 2015 IEEE Global Communications Conference (GLOBECOM), Dec. 2015, 7 pages.
Park et al., "Interference Management via Sliding-Window Superposition Coding", 2014 Globecom Workshops—Emerging Technologies for 5G Wireless Cellular Networks, Dec. 2014, pp. 972-976.

* cited by examiner

[Rate Region of UE1]

APPARATUS AND METHOD FOR GENERATING AND TRANSMITTING CQI IN A WIRELESS NETWORK

CROSS-REFERENCE TO RELATED APPLICATION AND CLAIM OF PRIORITY

This application is related to and claims priority to Korean Patent Application No. 10-2016-0151732, filed on Nov. 15, 2016, the contents of which are incorporated herein by reference.

TECHNICAL FIELD

Various embodiments of the present disclosure relate to a technology of transmitting channel quality information (CQI) by estimating a channel and processing the received CQI, at the time of applying sliding-window superposition coding (SWSC) in a cellular communication environment.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Recently, a sliding-window superposition coding (SWSC) technique capable of greatly reducing the influence of interference signals caused by neighboring cells in a cellular network has been proposed. FIG. 1 is a diagram illustrating an interference environment in which sliding-window superposition coding may be applied.

Referring to FIG. 1, a first base station 100 (hereinafter, referred to as a base station (BS), a cell, or the like) is located in cell 1 110, a second base station 101 is located in cell 2 111, and a third base station 102 is located in cell 3 112, and a first terminal 120 (hereinafter, referred to as a mobile station (MS), a terminal, user equipment, or the like) receives signals that are transmitted from the first base station 100 and the third base station 102 and a second terminal 121 receives a signal that is transmitted from the second base station 101. At this time, the second terminal 121 receives all the signals that are transmitted from the first and third base stations 100 and 102, which act as an interference with the second terminal 121.

The sliding-window superposition coding method that may be applied in such a situation will be described based on the following Table 1.

TABLE 1

| Block | 1 | 2 | 3 | ... | b − 1 | b |
|---|---|---|---|---|---|---|
| U | 1 | $m_{11}$ | $m_{12}$ | ... | ... | $m_{1,b-1}$ |
| V | $m_{11}$ | $m_{12}$ | ... | ... | $m_{1,b-1}$ | 1 |
| $X_1 = f(U, V)$ | | | | ... | | |
| $X_2$ | | $m_{21}$ | $m_{22}$ | ... | ... | $m_{2,b-1}$ $m_{2b}$ |
| $Y_1$ | | $\emptyset \hat{m}_{21}$ | $\hat{m}_{11}$ $\hat{m}_{22}$ | $\hat{m}_{12}$ ... | ... | ...$\hat{m}_{2,b-1}\hat{m}_{1,b-1}\hat{m}_{2b}$ |
| $Y_2$ | | $\emptyset$ $\emptyset$ | $\hat{m}_{11}$ $\hat{m}_{21}$ | $\hat{m}_{12}$ $\hat{m}_{22}$ | ... ... | $\hat{m}_{1,b-1}$ $\hat{m}_{2,b-1}, \hat{m}_{2b}$ |

Transmitter 1 transmits codeword X1 to receiver 1 and a transmitter 2 transmits codeword X2 to receiver 2. At this time, the transmitter may be a base station and the receiver may be a terminal. The transmitter transmits one message over a plurality of blocks and forms a codeword by superposing a plurality of layers to transmit the message over a plurality of blocks. Specifically, the transmitter 1 performs superposition coding on U and V codewords to generate the codeword X1, and the transmitter 2 transmits the codeword X2 in an existing manner. At this time, the U codeword and the V codeword may each be called one layer. Here, the codeword means an encoder output or a transmission symbol after the encoder output has undergone modulation (for example, a QAM symbol).

In block 1 that is a first block, the transmitter 1 codes message 1 known in advance to all transceivers into the codeword U(1), codes message m11 to be transmitted to the receiver into codeword V(1), and then performs superposition coding on the U(1) and V(1) to generate codeword X1(1) and transmit the generated codeword X1(1) to the receiver 1. In block 2 that is a second block, the message m11 is coded into codeword U(2), message m12 is coded into codeword V(2), and then the U(2) and V(2) are subject to superposition coding to generate codeword X1(2) and transmit the generated codeword X1(2) to the receiver 1. The transmitter 1 transmits the codeword generated up to block b-1 to the receiver 1 in the same manner, codes messages m1 and b-1 into the codeword U(b) in block b that is a last block, codes the message 1 known in advance to all the transceivers into codeword V(b), and then performs superposition coding on the U(b) and V(b) to generate the codeword X1(b) and transmit the generated codeword X1(b) to the receiver 1.

The transmitter 2 codes message m21 into codeword X2(1) and transmits the codeword X2(1) to the receiver 2 in the block 1 and codes message m22 into codeword X2(2) in the block 2 and transmits the codeword X2(2) to the receiver 2. The transmitter 2 transmits the codeword generated up to the block b to the receiver 2 in the same manner.

Because the transmitter has transmitted the same message over two blocks, the receiver performs decoding using the superposed received signal transmitted over the two blocks. The signal transmitted from the transmitter 1 passes through the receiver 1 from the transmitter 1 which is a desired channel, and the signal transmitted from the transmitter 2 passes through the receiver 1 from the transmitter 2 which is an interference channel, such that the receiver 1 receives a received signal Y1 with the superposed signal and noise. The signal transmitted from the transmitter 2 passes through the receiver 2 from the transmitter 2 which is a desired channel, and the signal transmitted from the transmitter 1 passes through the receiver 2 from the transmitter 1 which is an interference channel, such that the receiver 2 receives a received signal Y2 with the superposed signal and noise. The receiver 1 cancels the U(1) using the message 1 known in advance based on Y1(1) and Y1(2) received in the block 1 and block 2 and treats the V(1) as noise to decode an interference signal X2(1) in the receiver 1 position. Thereafter, the U(1) is canceled by using the message 1, the X2(1) decoded in the previous step is canceled, and the V(2) and the X2(2) are treated as noise to decode [V(1) U(2)] which is a desired signal, to thereby recover the message m11. If a received signal Y1(3) superposed in block 3 is received U(2), that is, m11 is treated as a message that is known in advance, such that the same operation is repeated. If a received signal Y1(b) superposed in the last block b is received by the receiver, the same operation is repeated, but because the V(b) is an already known message, the information may be canceled.

The receiver 2 also repeats the operation similar to the receiver 1. The receiver 2 cancels the U(1) using the message 1 known in advance based on the Y1(1) and Y1(2) received in the block 1 and block 2 and deals with the X2(1), V(2), and X2(2) as noise to decode the interference signal [V(1) U(2)] in the receiver 1 position, to thereby recover the m11. Thereafter, the U(1) is canceled by using message 1 and the V(1) decoded in the previous step is canceled to decode the X2(1), to thereby recover the message m21. Similar to the receiver 1, the receiver 2 repeats the same operation, and the decoding is performed in the last block b by using the fact that the V(b) including the already known message is used in the last block b.

SUMMARY

To address the above-discussed deficiencies, it is a primary object to provide the provision of a channel quality indicator (CQI) type, a method of generating a CQI in a terminal, a CQI feedback method of a terminal, and a method for processing a CQI in a base station that are required to use a sliding-window superposition coding (SWSC) technique securing excellent performance under a multi-cell environment in which other cell interference signals exist.

Objects of the present disclosure are not limited to the above-mentioned objects. That is, other objects that are not mentioned may be obviously understood by those skilled in the art to which the present disclosure pertains from the following description.

Various embodiments of the present disclosure are directed to the provision of a CQI transmission method of a terminal in a wireless communication system, including: estimating a channel of a serving base station and an interference base station to which sliding-window superposition coding (SWSC) is applied; generating channel quality information (CQI)-related information on the serving base station and the interference base station based on the estimated channel to indicate an achievable rate region; and transmitting the generated CQI-related information.

Various embodiments of the present disclosure are directed to the provision of a CQI processing method of a base station in a wireless communication system, including: transmitting a reference signal from the base station to which sliding-window superposition coding (SWSC) is applied to a terminal; receiving CQI-related information on the base station and the interference base station signal from the terminal; and checking information on an achievable rate region of the terminal based on the received CQI-related information.

Various embodiments of the present disclosure are directed to the provision of a terminal in a wireless communication system, including: a transceiver transmitting and receiving a signal; and a controller performing a control to estimate a channel of a serving base station and an interference base station to which sliding-window superposition coding (SWSC) is applied, generate channel quality information (CQI)-related information on the serving base station and the interference base station based on the estimated channel to indicate an achievable rate region, and transmit the generated CDI-related information.

Various embodiments of the present disclosure are directed to the provision of a base station in a wireless communication system, including: a transceiver transmitting and receiving a signal; and a controller performing a control to transmit a reference signal from the base station to which sliding-window superposition coding (SWSC) is applied to a terminal, receive CQI-related information on the base station and the interference base station from the terminal, and check information on an achievable rate region of the terminal based on the received CQI-related information.

According to the embodiment of the present disclosure, the excellent performance of the sliding-window superposition coding technique can be used in the cellular environment by effectively transmitting the information on the achievable rate region of the receiver to a transmitter.

The effects that may be achieved by the embodiments of the present disclosure are not limited to the above-mentioned objects. That is, other effects that are not mentioned may be obviously understood by those skilled in the art to which the present disclosure pertains from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
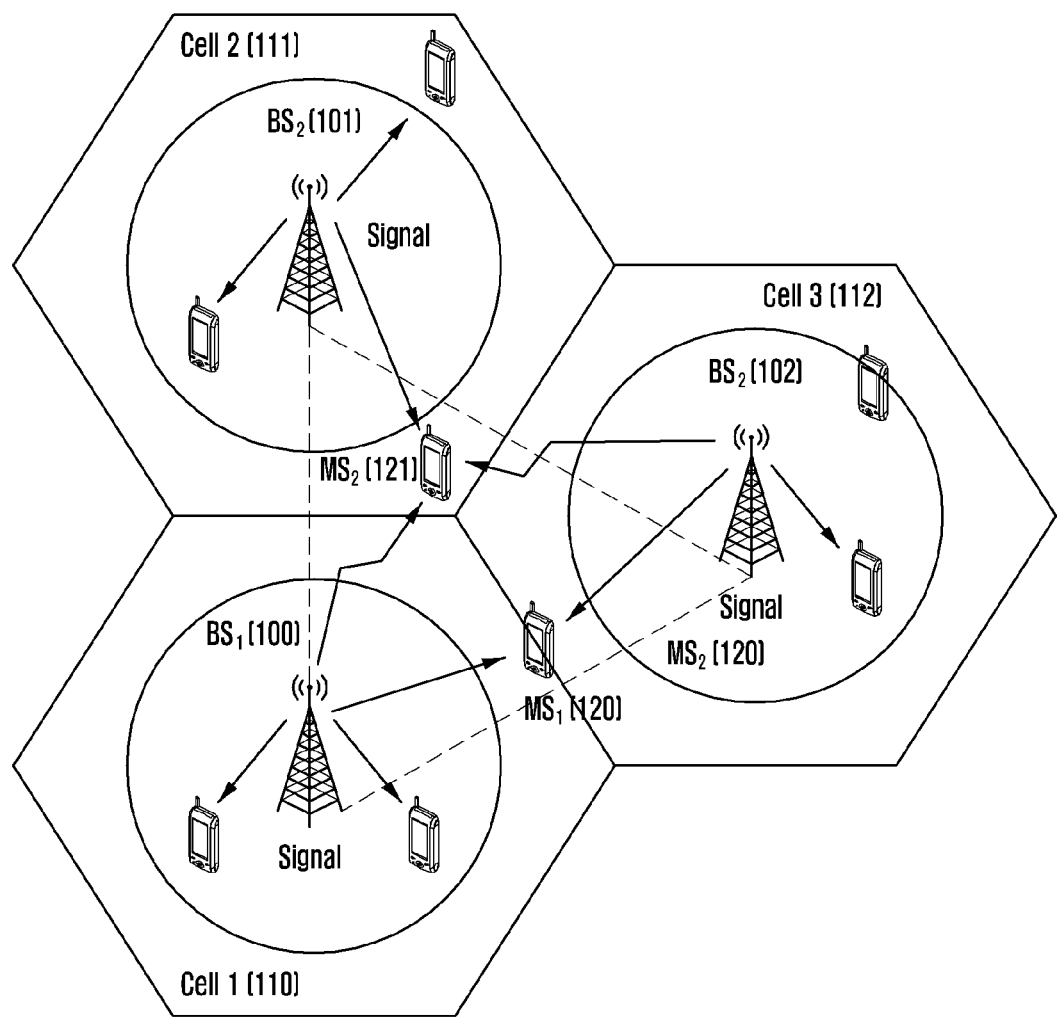
FIG. 1 is a diagram illustrating an interference environment in which sliding-window superposition coding may be applied.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the present disclosure will be described in detail with reference to the accompanying drawings. The exemplary embodiments of the present disclosure may be variously changed and variously practiced, but specific exemplary embodiments are illustrated in the accompanying drawings and detailed contents thereof will be described. However, it is to be understood that the present disclosure is not limited to the specific exemplary embodiments, but includes all modifications and/or equivalents, and substitutions included in the spirit and the scope of the present disclosure. Throughout the accompanying drawings, similar components will be denoted by similar reference numerals.

The expressions such as "comprise" or "may comprise" that may be used in the present disclosure indicate the presence of the corresponding functions, operations, or components, etc., but do not limit at least one additional function, operation, or component, etc. Further, it will be further understood that the terms "comprises" or "have" used in the present disclosure, specify the presence of stated features, numerals, steps, operations, components, parts mentioned in this specification, or a combination thereof, but do not preclude the presence or addition of one or more other features, numerals, steps, operations, components, parts, or a combination thereof.

The expression such as "or" in the present disclosure includes any and all combinations of words listed together. For example, "A or B" may include A, include B, or include both of A and B.

The expressions such as "first," "second," "No. 1", "No. 2," etc. of the present disclosure can modify various elements of the present disclosure, but do not limit the corresponding constituent elements For example, the expressions do not limit order and/or importance, or the like of the corresponding components The expressions may be used to differentiate one component from other components. For example, both of a first user device and a second user device are user devices and represent different user devices. For example, a 'first' component may be named a 'second' component and the 'second' component may also be similarly named the 'first' component, without departing from the scope of the present disclosure.

It is to be understood that when one component is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween.

Terms used in the present disclosure are used only in order to describe specific exemplary embodiments rather than limiting the present disclosure. Singular forms used herein are intended to include plural forms unless context explicitly indicates otherwise.

Unless defined otherwise, it is to be understood that all the terms used in the specification including technical and scientific terms have the same meaning as those that are generally understood by those who skilled in the art to which the present disclosure pertains. It must be understood that the terms defined by the dictionary are identical with the meanings within the context of the related art, and they should not be ideally or excessively formally defined unless the context clearly dictates otherwise.

In this specification, a transmitter may include an apparatus, for example, a base station for transmitting a signal by applying sliding-window superposition coding (SWSC), and a receiver may include an apparatus, for example, a terminal for receiving the signal.

Figure 2:
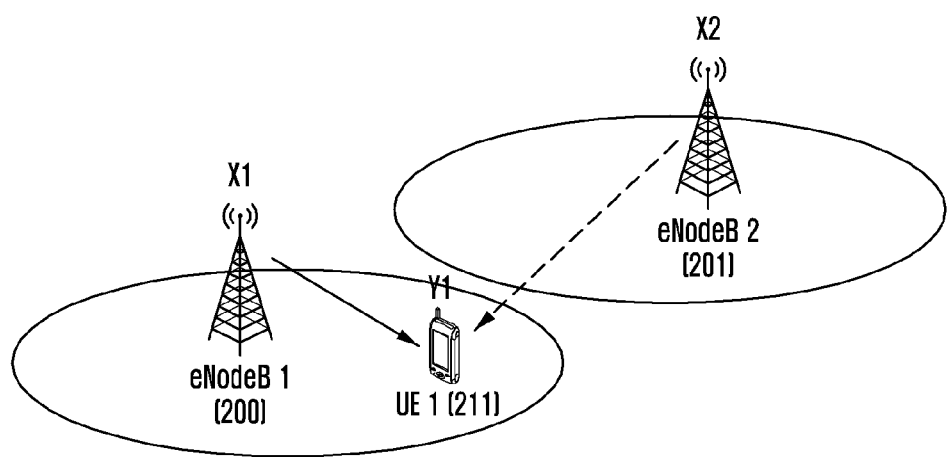
FIG. 2 is a conceptual diagram of a terminal receiving a serving base station signal and an interference base station signal.

FIG. 2 illustrates a conceptual diagram of a terminal receiving (Y1) a serving base station signal X1 and an interference base station signal X2. (Serving base station 200=transmitter 1, interference base station 201=transmitter 2, and terminal 211=receiver). At this time, if the transmitter 1 and the transmitter 2 each perform superposition coding on codewords X1 and X2 and the receiver may select at least one of four decoding orders illustrated in FIGS. 3A to 3D and perform decoding on the received signal. The number of decoding sequences at the time of the SWSC transmission may vary depending on the structure of the SWSC transmission.

FIGS. 3A to 3D are diagrams illustrating an operation of various decoding sequences that are an important feature of the sliding-window superposition coding technique. For example, X1(C1,1) means a codeword of a C1,1 message of the serving base station, and X2(C2,1) means a codeword of a C2,1 message of the interference base station.

Figure 3A:
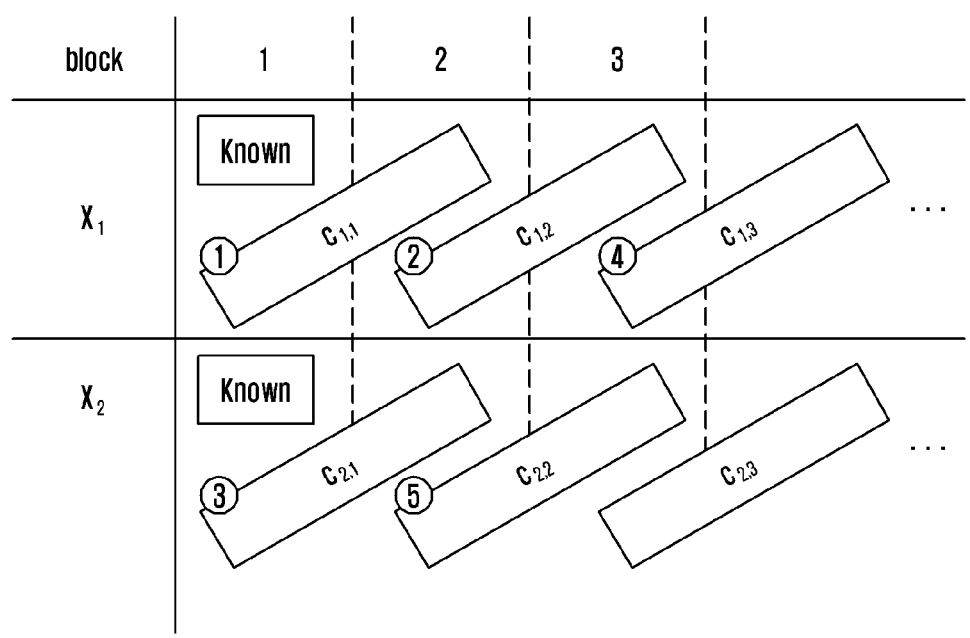
FIGS. 3A to 3D are diagrams illustrating various decoding sequences in the sliding-window superposition coding technique.

FIG. 3A illustrates a first decoding sequence. Decoding on the first decoding sequence, the receiver performs decoding on the received signal in order of X1(C1,1), X1(C1,2), X2(C2,1), X1 (C1,3), and X1(C2,2).

Figure 3B:
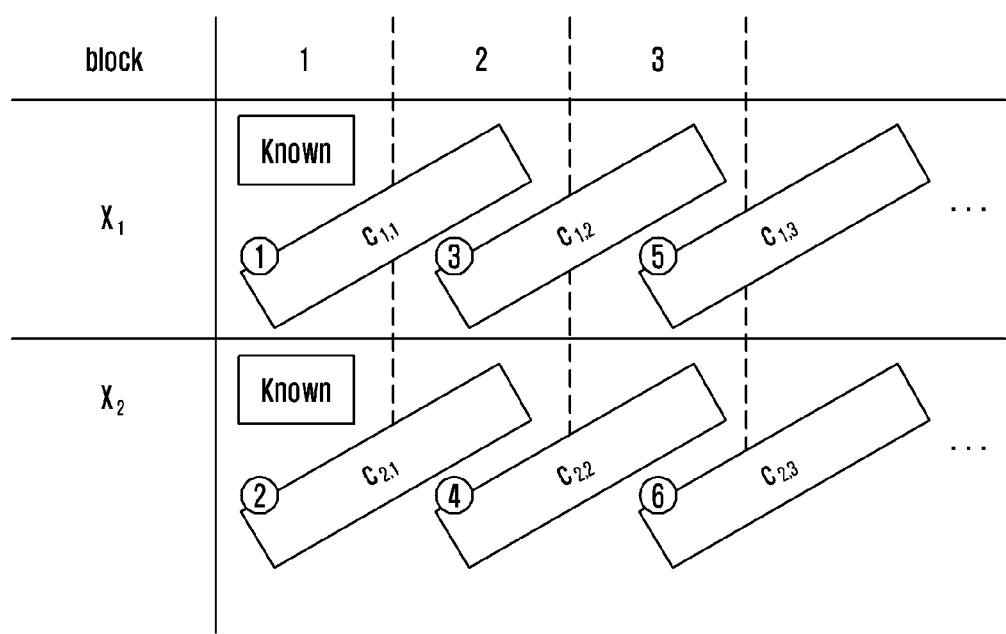

FIG. 3B illustrates a second decoding sequence. Decoding on the second decoding sequence, the receiver performs decoding on the received signal in order of X1(C1,1), X2(C2,1), X1(C1,2), X2(C2,2), X1(C1,3), and X2(C2,3).

Figure 3C:
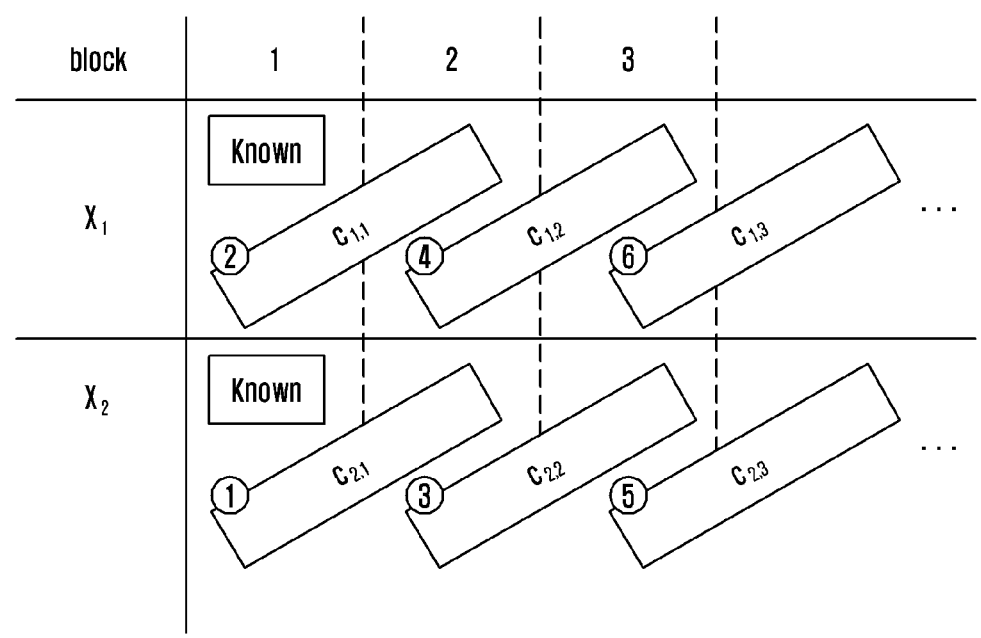

FIG. 3C illustrates a third decoding sequence. Decoding on the third decoding sequence, the receiver performs decoding on the received signal in order of X2(C2,1), X1(C1,1), X2(C2,2), X1(C1,2), X2(C2,3), and X1(C1,3).

Figure 3D:
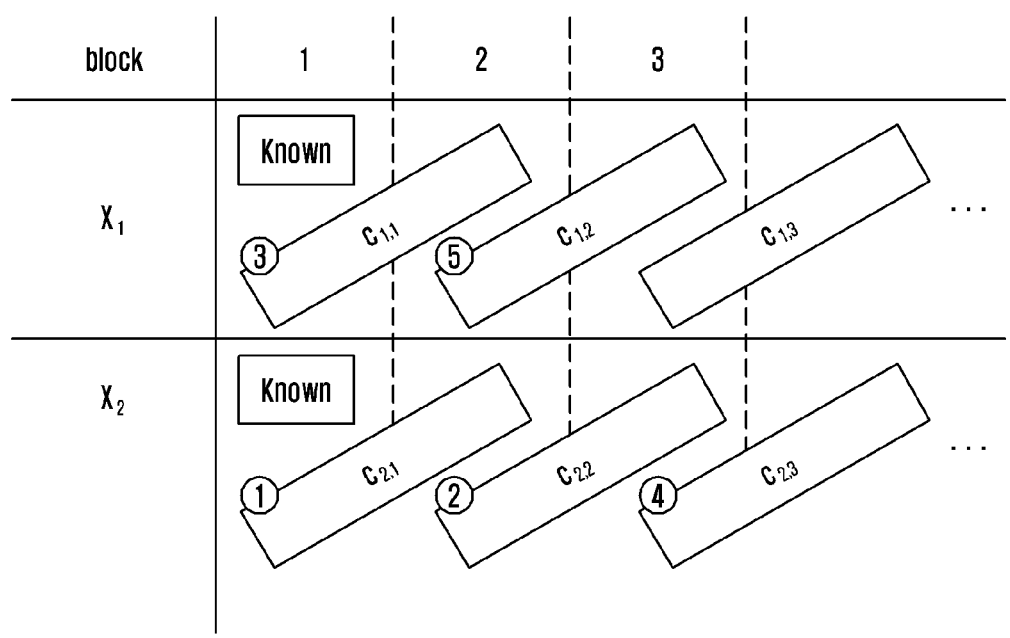

FIG. 3D illustrates a fourth decoding sequence. Decoding on the fourth decoding sequence, the receiver performs decoding on the received signal in order of X2(C2,1), X2(C2,2), X1(C1,1), X2 (C2,3), and X1(C1,2).

If the sliding-window superposition coding technique is used, a rate pair that can be transmitted varies depending on the decoding sequence selected by the receiver.

Figure 4:
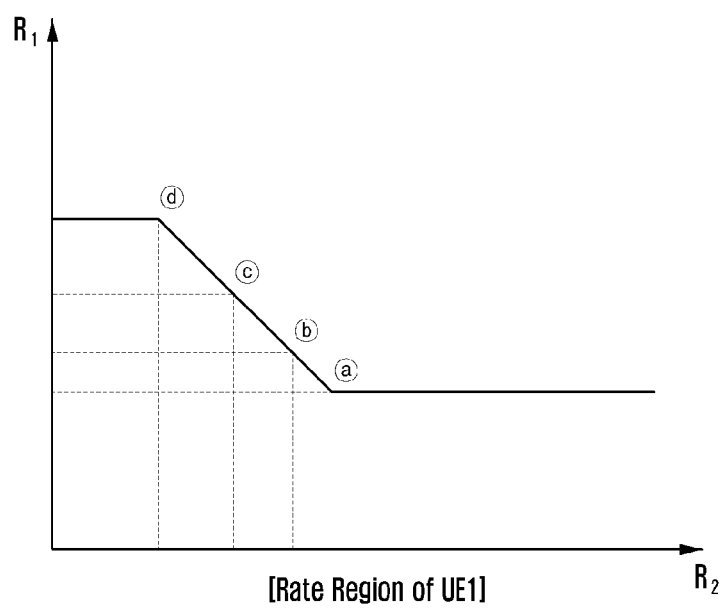
FIG. 4 is a diagram illustrating information on an achievable rate of a terminal determined depending on a decoding sequence.

FIG. 4 illustrates the achievable rate pair of the receiver varying depending on the decoding sequence. Here, R1 means a rate that can be achieved at the time of decoding a serving base station signal X1, and R2 means a rate that can be achieved at the time of decoding an interference base station signal X2. FIG. 4 illustrates an achievable rate region of a terminal UE1. Here, a, b, c, and d in FIG. 4 indicate the rate region that can be achieved depending on the decoding sequence of FIGS. 3A, 3B, 3C, and 3D (may be replaced by an achievable rate region). As described above, the reason why the achievable rate region varies depending on the decoding sequence is that a degree of interference felt when the decoding starts depending on the decoding sequence varies.

The sliding-window superposition coding is a coding method capable of achieving theoretical threshold performance of a physical layer in the additive white Gaussian noise (AWGN) interference environment without fading, which shows high efficiency. The sliding-window superposition coding technique has performance superior to the network assisted interference cancellation and suppression (NAICS) technology which is the related art of the field standardized in the 3GPP Rel.12. The interference control techniques proposed and standardized in the NAICS are only to control the interference at a QAM symbol level of the interference signal, whereas the sliding-window superposition coding technique controls the interference signal at a codeword level. In addition, features that achieves the theoretical threshold performance in the interference environment ensure performance superior to other codeword level interference control techniques.

In order to use the excellent performance of the sliding-window superposition coding scheme in the cellular environment, the terminal have to be able to effectively transmit the information on the achievable rate region to the base station (transmitting end). In particular, since the sliding-window superposition coding technique achieves the threshold performance, it is preferable to not only transmit the information on the theoretically achievable rate region to the base station but also transmit the information on various rate regions that can be achieved depending on the decoding sequence to the base station. In cellular communication including LTE, several rates are preset in the form of the modulation and coding scheme (MCS), so that the transmitting end and the receiving end may transmit rate values to each other only by a simple MCS index. Here, the achievable rate information that the terminal transmits to the base station is called a channel quality indicator (CQI). The CQI defined in the LTE indicates the highest MCS level among the MCS levels that are determined (estimated) that the probability of error occurrence of the terminal is 10% or less upon the actual transmission among predetermined MCS levels.

Figure 5A:
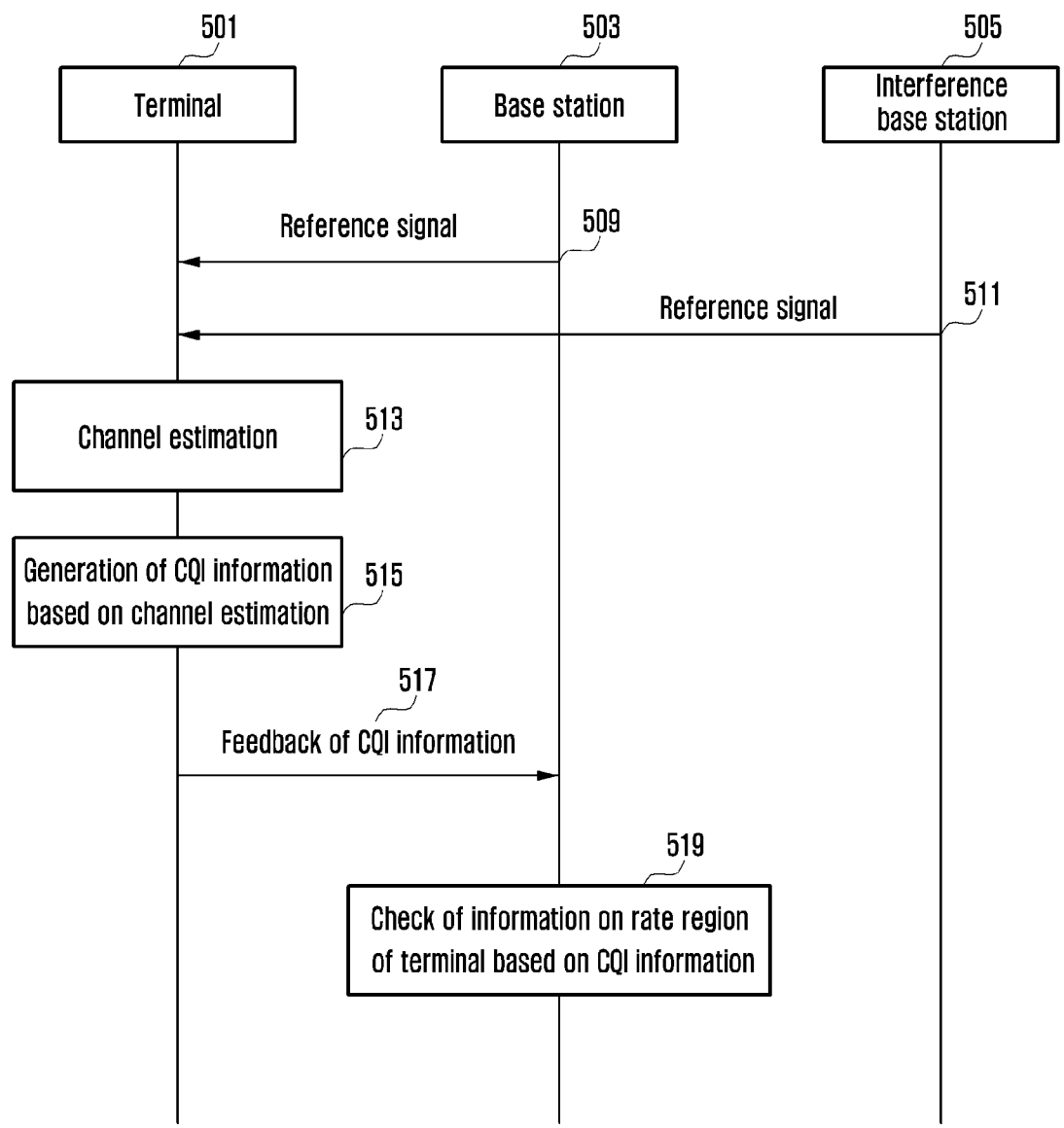
FIG. 5A is a diagram illustrating an operation of generating and feeding back a CQI for a serving base station and an interference base station to which the sliding-window superposition coding technique according to an embodiment of the present disclosure is applied.

FIG. 5A is a diagram illustrating an operation of generating and feeding back a CQI for the serving base station and the interference base station to which the sliding-window superposition coding technique according to an embodiment of the present disclosure is applied.

The terminal 501 may receive a signal (e.g., a reference signal) for channel estimation from the serving base station 503 in step 509 and receive a signal for channel estimation (e.g., a reference signal) from an interference base station 505 neighboring thereto in step 511. In step 513, the terminal 501 may estimate a channel for the serving base station 503 and the interference base station 505 based on the received reference signals.

In step 515, the terminal 501 may generate CQI information (CQI related information) on the serving base station 503 and the interference base station 505 based on the estimated channel. Describing below in detail, for example, the terminal 501 may convert the estimated channel into the equivalent channel and generate the CQI information on each of at least one decoding sequence associated with the SWSC using the equivalent channel.

In step 517, the generated CQI information may be transmitted to the base station 503.

The at least one decoding sequence may include, for example, at least one of the decoding sequences described above with reference to FIGS. 3A to 3D. The generated CQI information includes, for example, at least one of CQI values (also referred to as CQI pairs) for each link (a link with a base station and a link with an interference base station) calculated according to the existing technique, CQI values for each link calculated in consideration of an interference signal, CQI values for each link acquired depending on each decoding sequence, a sum rate CQI value meaning a sum rate achievable by performing joint decoding on X1 and X2, and a CQI offset value. For example, the terminal 501 may select a plurality of values based on a predetermined rule from the CQI values and the CQI offset values so that the base station 503 may know the information on the rate region of the terminal and transmit the CQI information including the selected values to the base station 503.

In step 519, the base station 503 may check the information on the rate region of the terminal 501 based on the received CQI information. The base station 503 may perform scheduling (MCS allocation) based on the received CQI information.

Figure 5B:
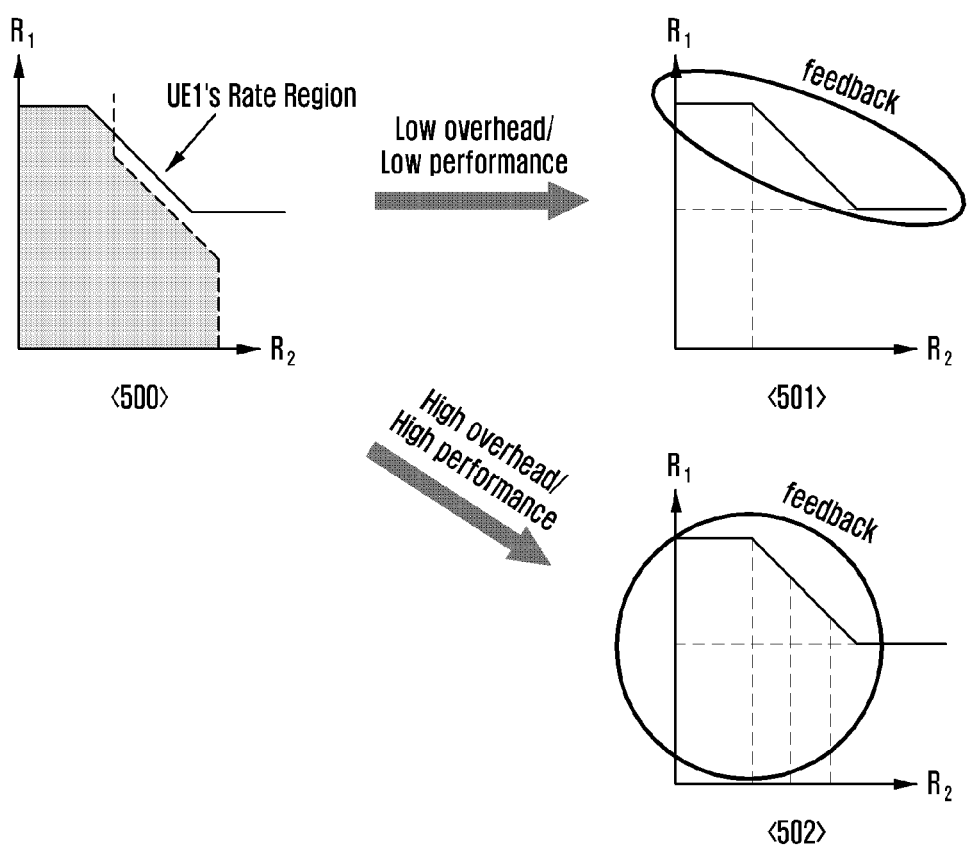
FIG. 5B is a diagram for explaining an achievable rate region of the terminal according to the embodiment of the present disclosure.

FIG. 5B is a diagram for explaining an achievable rate region of the terminal 501 according to the embodiment of the present disclosure.

Reference numeral 500 denotes the achievable rate region of the terminal. The terminal may feed back the CQI information so that it may inform the base station of the rate region and feed back another CQI information according to the situation.

For example, in the condition where low overhead/low performance is implemented, as in the step 501, the terminal may feed back the CQI information on the serving base station and the interference base station without considering the SWSC transmission. The details will be described below with reference to the FIG. 6.

In the condition where high overhead/high performance is implemented, as in the step 502, the CQI information on the serving base station and the interference base station may be fed back depending on the decoding sequence in consideration of the SWSC transmission. The details will be described below with reference to the FIGS. 7 and 8.

Figure 6:
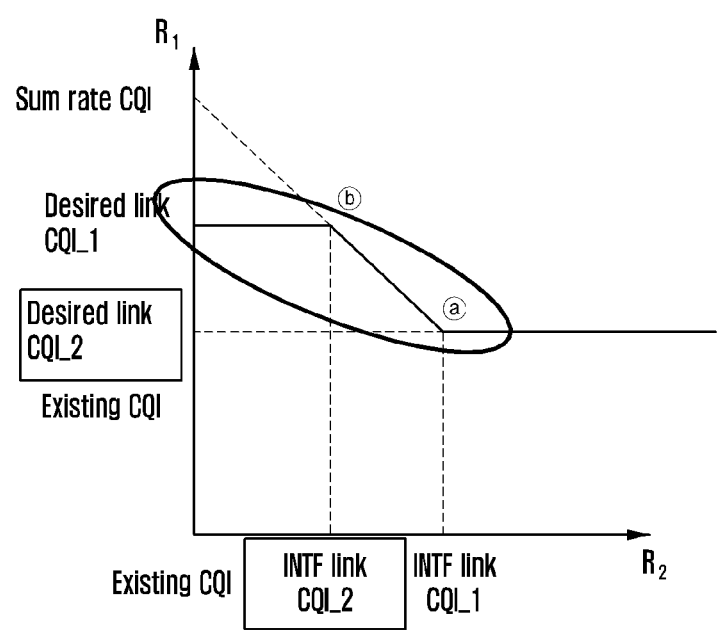
FIG. 6 is a diagram illustrating an example of CQI information feedback in the condition where the sliding-window superposition coding technique according to the embodiment of the present disclosure is applied.

FIG. 6 is a diagram illustrating an example of CQI information feedback in the condition where the sliding-window superposition coding technique according to the embodiment of the present disclosure is applied.

The present example may be applied, for example, when interference is relatively weak based on signal-to-interference ratio (SIR)/interference-to-noise ratio (INR) information that the UE periodically measures (e.g., when SIR/INR is smaller than the reference value).

In order for the base station to know the rate region of the terminal, the terminal must transmit three proper CQI values among the following five CQI values as the CQI information to the base station.

1) Desired link CQI_1=I(X1;Y1|X2)
2) Desired link CQI_2=I(X1;Y1)
3) INTF link CQI_1=I(X2;Y1|X1)
4) INTF link CQI_2=I(X2;Y1)
5) Sum rate CQI=I(X1, X2|Y1)

The I(X1; Y1) means mutual information of X1 and Y1.

Desired link CQI_2 means CQI associated with the serving base station signal X1 measured by the existing method and Desired link CQI_1 means CQI associated with the serving base station signal X1 considering the interference due to the interference base station signal X2.

INTF link CQI_2 means CQI associated with the interference base station signal X2 measured by the existing method and INTF link CQI_1 means CQI associated with the interference base station signal X2 considering the interference due to the serving base station signal X1.

Sum rate CQI does not mean the sum of the CQIs for each link but theoretically means the sum rate achievable by simultaneously performing the joint decoding on the X1 and X2.

Example) Sum rate=Desired link CQI_1+INTF link CQI_2
=Desired link CQI_2+INTF link CQI_1

If the three proper CQIs are transmitted, the base station may check the information on the rate region of the terminal since it may know values a and b in FIG. 6.

For example, in the case of transmitting the Sum rate CQI, the Desired link CQI_1, and the Desired link CQI_2, the following transmission methods are possible.

First, the values of the sum rate CQI, the Desired link CQI_1, and the Desired link CQI_2 may be fed back as CQI information as they are. Like the LTE, 12 bits are required when one CQI index is expressed by 4 bits.

Second, one CQI and two offsets may be transmitted using the relationship like sum rate CQI>=Desired link CQI_1>=Desired link CQI_2 to reduce the feedback data amount. In the case of performing the transmission as in the present example, if the offset is represented by 2 bits, 8 bits are required. The base station may check the rate region as follows by using the received CQI and the two offset values.

Example 1) Sum rate CQI, Sum rate CQI-offset1, Sum rate CQI-offset1-offset2

Example 2) Desired link CQI_1+offst1, Desired link CQI_1, Desired link CQI_1-offset2)

Example 3) Desired link CQI_2+offst1+offset2, Desired link CQI_2+offst1, Desired link CQI_2

Figure 7:
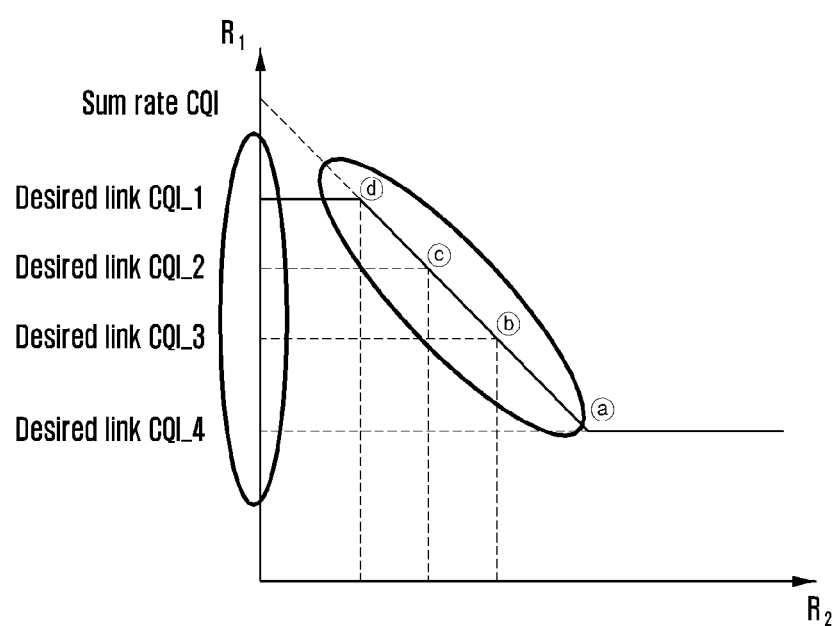
FIG. 7 is a diagram illustrating another example of the CQI information feedback in the condition where the sliding-window superposition coding technique according to the embodiment of the present disclosure is applied.

FIG. 7 is a diagram illustrating another example of the CQI information feedback in the condition where the sliding-window superposition coding technique according to the embodiment of the present disclosure is applied.

The present example may be applied, for example, when interference is relatively strong based on signal-to-interference ratio (SIR)/interference-to-noise ratio (INR) information that the UE periodically measures (e.g., when SIR/INR is larger than the reference value).

The feature of the present example is that the CQI is calculated depending on the decoding sequence in consideration of the SWSC transmission. Here, it is assumed that the sum rate achievable depending on various decoding sequences is constant. The Sum rate CQI is one value which is referenced. The achievable rate related to the interference base station signal X2 may be obtained using the sum rate CQI and the CQI related to the base station signal X1.

For example, the achievable CQI associated with the interference base station signal X2 may be converted in the form of the sum rate—desired rate after being converted into the sum rate CQI and the CQI associated with the serving base station signal X1. Referring to FIG. 7, the base station may check values a, b, c, and d using the sum rate CQI and the CQI values depending on the decoding sequence to know the rate area of the terminal.

According to the present example, the CQI that the terminal transmits is the Sum rate CQI, the Desired link CQI_1, the Desired link CQI_2, the Desired link CQI_3, and the Desired link CQI_4, and the following transmission methods may be considered.

First, the values of the Sum rate CQI, the Desired link CQI_1, the Desired link CQI_2, the Desired link CQI_3, and the Desired link CQI_4 may be fed back as the CQI information as they are.

Second, one CQI and two offsets may be transmitted using the relationship like sum rate CQI>=Desired link CQI_1>=Desired link CQI_2>=Desired link CQI_3>=Desired link CQI_4 to reduce the feedback data amount. The base station may check the rate region as follows by using the received CQI and the two offset values.

Example 1) Sum rate CQI, Sum rate CQI-offset1, Sum rate CQI-offset1-offset2, Sum rate CQI-offset1-offset2-offset3, Sum rate CQI-offset1-offset2-offset3-offset4

Example 2) Desired link CQI_4+offset1+offset2+offset3+offset4, Desired link CQI_4+offset1+offset2+offset3, Desired link CQI_4+offset1+offset2, Desired link CQI_4+offset1, Desired link CQI_4

Figure 8:
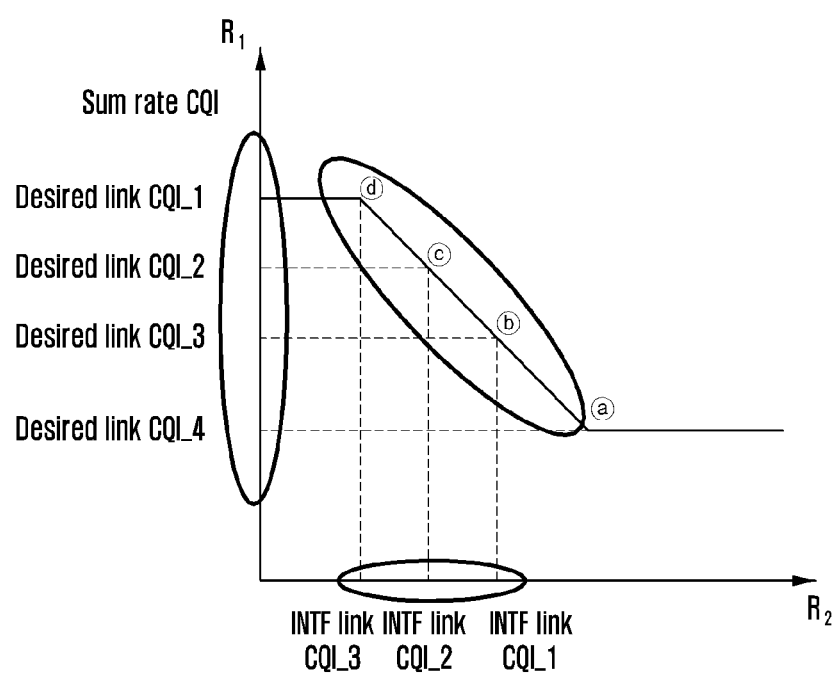
FIG. 8 is a diagram illustrating another example of the CQI information feedback in the condition where the sliding-window superposition coding technique according to the embodiment of the present disclosure is applied.

FIG. 8 is a diagram illustrating another example of the CQI information feedback in the condition where the sliding-window superposition coding technique according to the embodiment of the present disclosure is applied.

The present example may be applied when interference is relatively strong based on signal-to-interference ratio (SIR)/interference-to-noise ratio (INR) information that the UE periodically measures (e.g., when the SIR is large and the INR is large).

The feature of the present example is that the CQIs depending on a decoding sequence are calculated in consideration of the SWSC transmission. According to the present example, a rate that may be achieved depending on various decoding sequences for the serving base station signal X1 and a rate that may be achieved depending on various decoding sequences for the interference base station signal X2 may be paired and transmitted as the CQI information.

For example, the Desired link CQIs have the relationship of Desired link CQI_1>=Desired link CQI_2>=Desired link CQI_3>=Desired link CQI_4, and therefore the following transmission methods may be possible.

First, the Desired link CQI_1, the Desired link CQI_2, the Desired link CQI_3, and the Desired link CQI_4 may be fed back as the CQI information as they are.

Second, one CQI and three offsets may be transmitted to reduce the feedback data amount. The base station may acquire the whole Desired link CQI as follows by using one CQI and three offset values.

For example, the INTF link CQIs have the relationship of INTF link CQI_1>=INTF link CQI_2>=INTF link CQI_3, and therefore the following transmission methods may be possible.

First, the INTF link CQI_1, the INTF link CQI_2, the INTF link CQI_3 may be fed back as the CQI information as they are.

Second, one CQI and two offsets may be transmitted to reduce the feedback data amount. The base station may acquire an INTF link CQI value as follows by using the received one CQI and two offset values.

Example) INTF link CQI_3+offset1+offset2, INTF link CQI_3+offset1, INTF link CQI_3

Referring to FIG. 8, the base station may check values a, b, c, and d using the CQIs depending on the decoding sequence of the serving base station signal X1 and the CQI values depending on the decoding sequence of the interference base station signal X2 to know the rate area of the terminal.

FIGS. 9A to 9D are diagrams illustrating a equivalent channels for generating CQI information depending on the decoding sequence according to an embodiment of the present disclosure. FIGS. 9A to 9D each correspond to the decoding sequence of FIGS. 3A to 3D.

PHY abstraction for the SWSC according to the embodiment of the present disclosure should be performed for each equivalent channel from which the serving base station signal and the interference base station signal suffer, and the resulting CQI pairs are calculated depending on the decoding sequence.

According to the SWSC technique, the equivalent channels from which the serving base station signal and the interference base station signal suffer may be different depending on the decoding sequence at the receiving end, and as a result, the decoding capability of the serving base station signal and the interference base station signal may be different. In a decoding process sequentially performed depending on a predetermined decoding sequence, a previously decoded signal is canceled. The reason is that the decoded signal has a different shape depending on the decoding sequence.

Figure 9A:
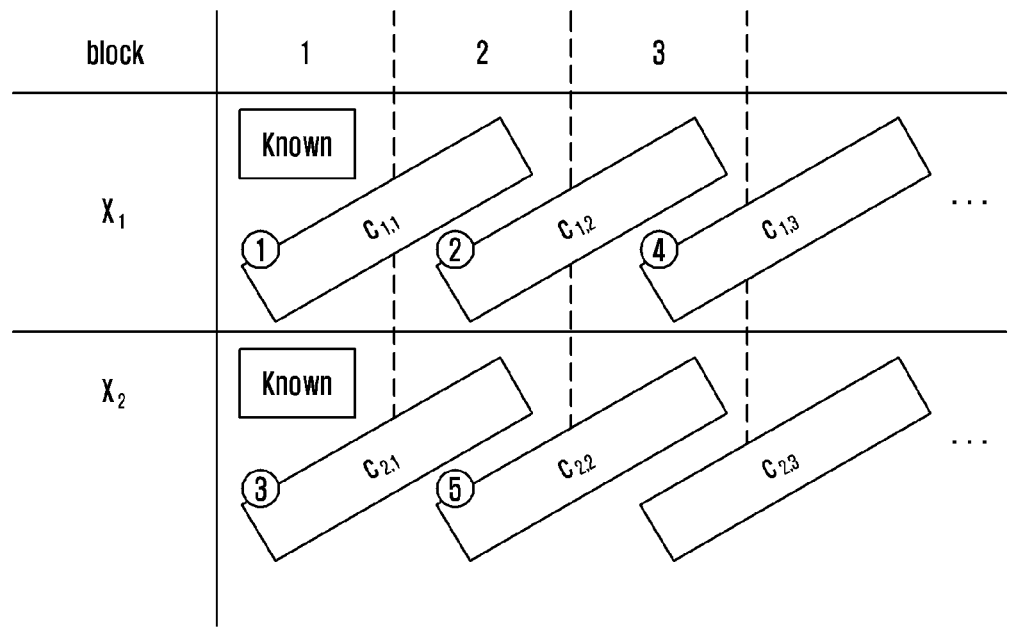
FIGS. 9A to 9D are diagrams illustrating a equivalent channels for generating CQI information depending on each decoding sequence according to an embodiment of the present disclosure.
Figure 9A:
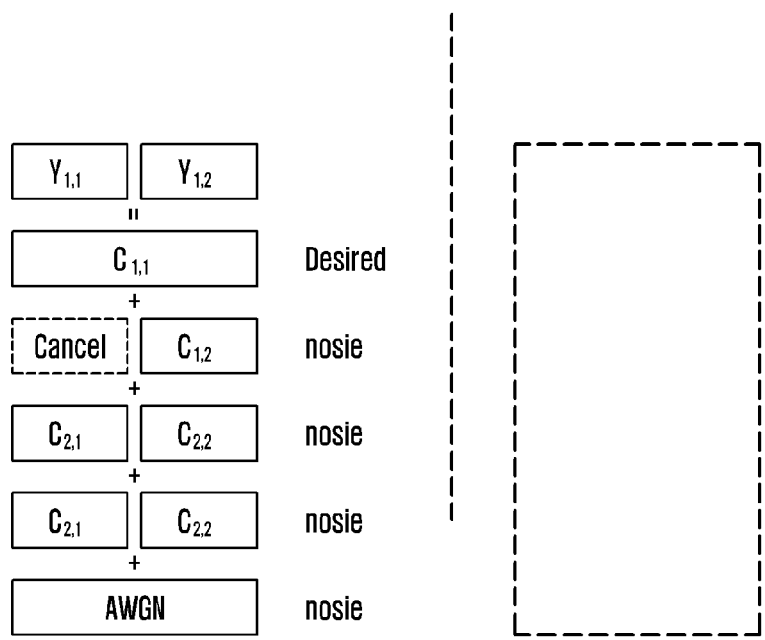

Referring to FIG. 9A, depending on the first decoding sequence in which the interference base station signal X2 is not decoded, there is only the CQI value associated with the serving base station signal X1 and there is no CQI value associated with the interference base station signal X2 does not exist.

The receiver, e.g., the terminal may calculate the equivalent channel by canceling the value known in advance, in assuming codeword decoding for the message C1,1 in association with the block 1 and the block 2. The PHY abstraction is performed for each equivalent channel to generate the CQI value corresponding to the first decoding sequence for the serving base station signal X1.

Figure 9B:
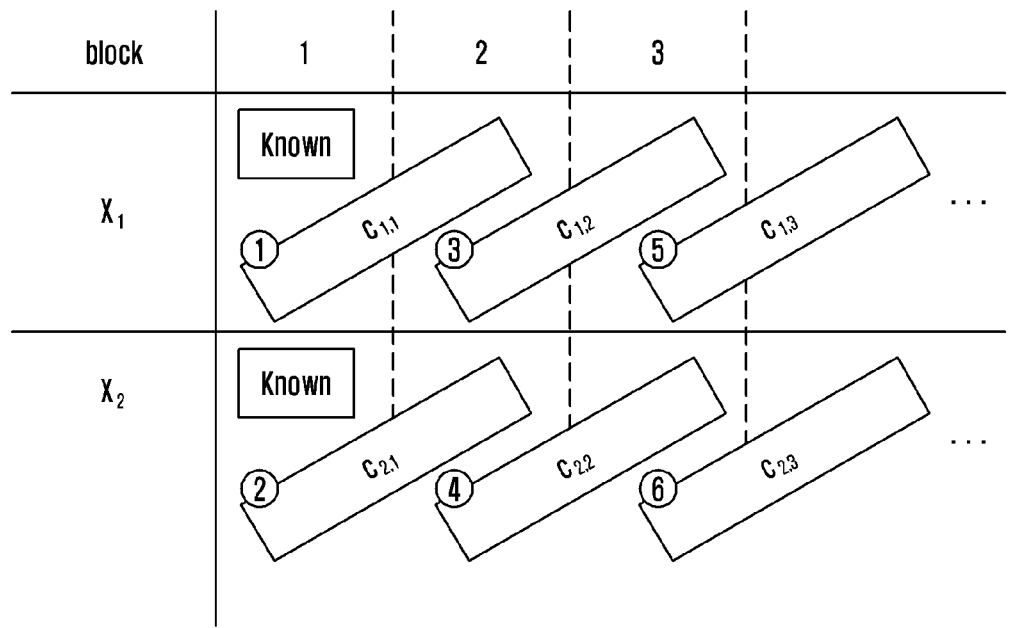
Figure 9B:
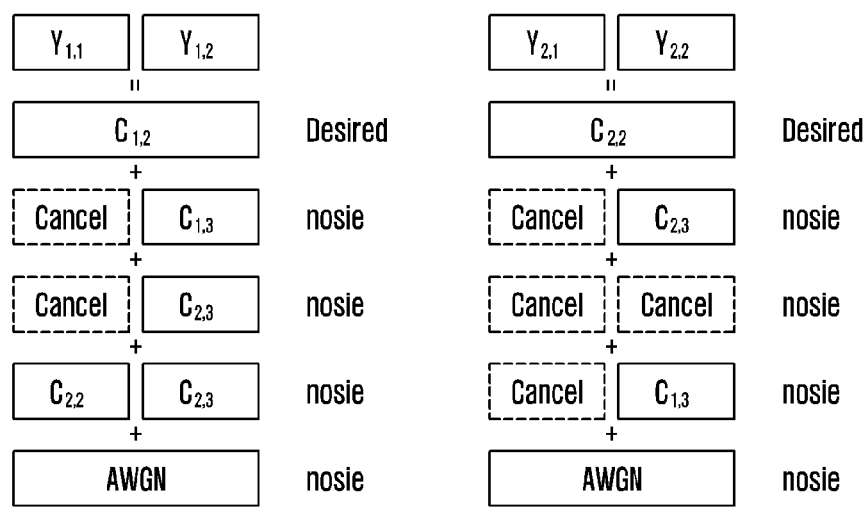

Referring to FIG. 9B, depending on the second decoding sequence, there are the CQI value associated with the serving base station signal X1 and the CQI value associated with the interference base station signal X2, that is, the CQI pair value.

The receiver, e.g., the terminal may calculate the equivalent channel by canceling the codeword for the message C1,1 to be previously decoded and the codeword for the message C2,1, in assuming the codeword decoding for the message C1,2 in association with the block 2 and the block 3. The PHY abstraction is performed for each equivalent channel to generate the CQI value corresponding to the second decoding sequence for the serving base station signal X1.

The receiver, e.g., the terminal may calculate the equivalent channel by canceling the codeword for the message C1,1 to be previously decoded, the codeword for the message C1,2, and the codeword for message C2,1, in assuming the codeword decoding for the message C2,2 in association with the block 2 and the block 3. The PHY abstraction is performed for each equivalent channel to generate the CQI value corresponding to the second decoding sequence for the interference base station signal X2.

Figure 9C:
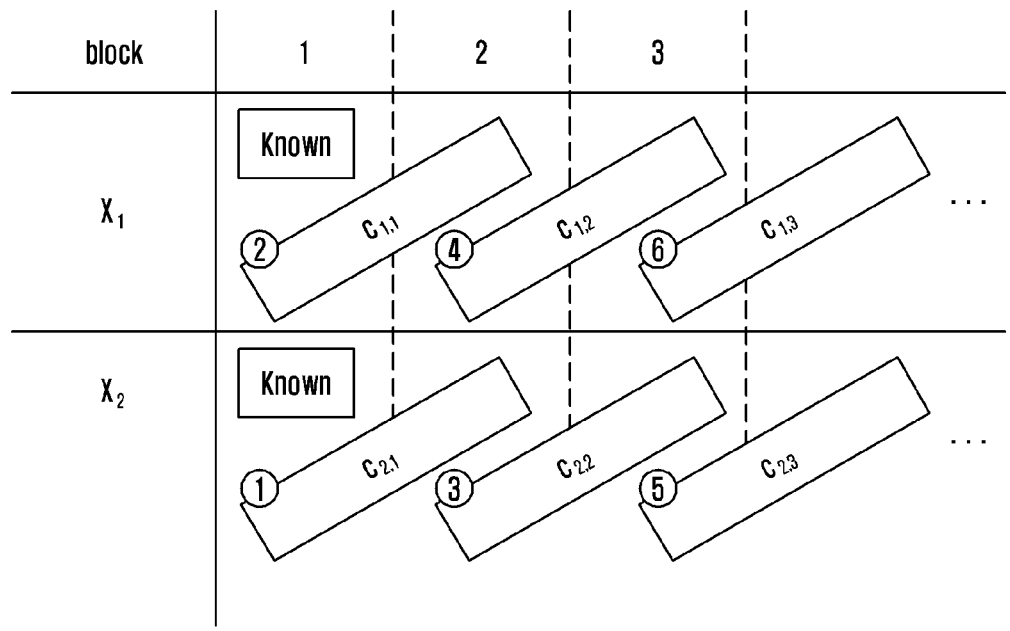
Figure 9C:
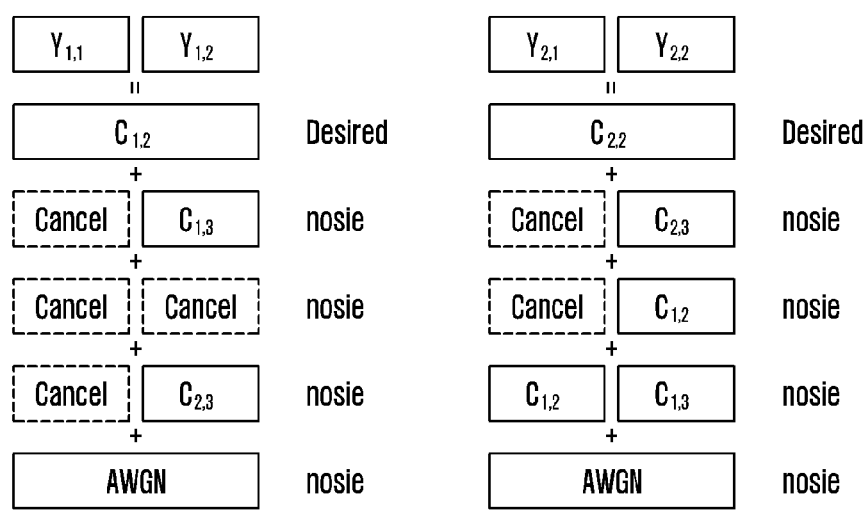

Referring to FIG. 9C, depending on the third decoding sequence, there are the CQI value associated with the serving base station signal X1 and the CQI value associated with the interference base station signal X2, that is, the CQI pair value.

The receiver, e.g., the terminal may calculate the equivalent channel by canceling the codeword for the message C1,1 to be previously decoded, the codeword for the message C2,1, and the codeword for the message C2,2, in assuming the codeword decoding for the message C1,2 in association with the block 2 and the block 3. The PHY abstraction is performed for each equivalent channel to generate the CQI value corresponding to the third decoding sequence for the serving base station signal X1.

The receiver, e.g., the terminal may calculate the equivalent channel by canceling the codeword for the message C1,1 to be previously decoded and the codeword for the message C2,1, in assuming the codeword decoding for the message C2.2 in association with the block 2 and the block 3. The PHY abstraction is performed for each equivalent channel to generate the CQI value corresponding to the third decoding sequence for the interference base station signal X2.

Figure 9D:
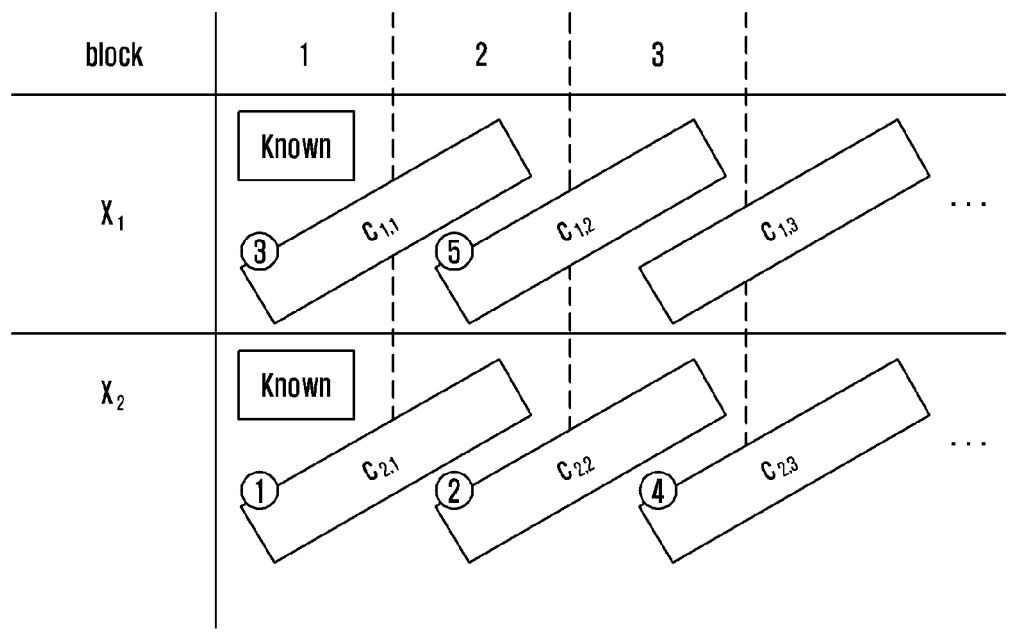
Figure 9D:
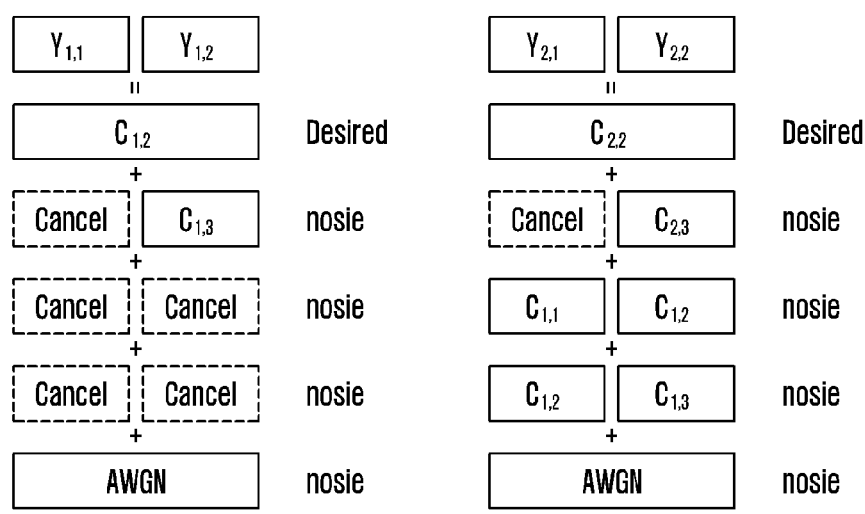

Referring to FIG. 9D, depending on the fourth decoding sequence, there are the CQI value associated with the serving base station signal X1 and the CQI value associated with the interference base station signal X2, that is, the CQI pair value.

The receiver, e.g., the terminal may calculate the equivalent channel by canceling the codeword for the message C1,1 to be previously decoded, the codeword for the message C2,1, the codeword for the message C2,2, and the codeword for the message C2,3, in assuming the codeword decoding for the message C1,2 in association with the block 2 and the block 3. The PHY abstraction is performed for each equivalent channel to generate the CQI value corresponding to the fourth decoding sequence for the serving base station signal X1.

The receiver, e.g., the terminal may calculate the equivalent channel by canceling the codeword for the message C2,1 to be previously decoded, in assuming the codeword decoding for the message C2.2 in association with the block 2 and the block 3. The PHY abstraction is performed for each equivalent channel to generate the CQI value corresponding to the fourth decoding sequence for the interference base station signal X2.

Figure 10:
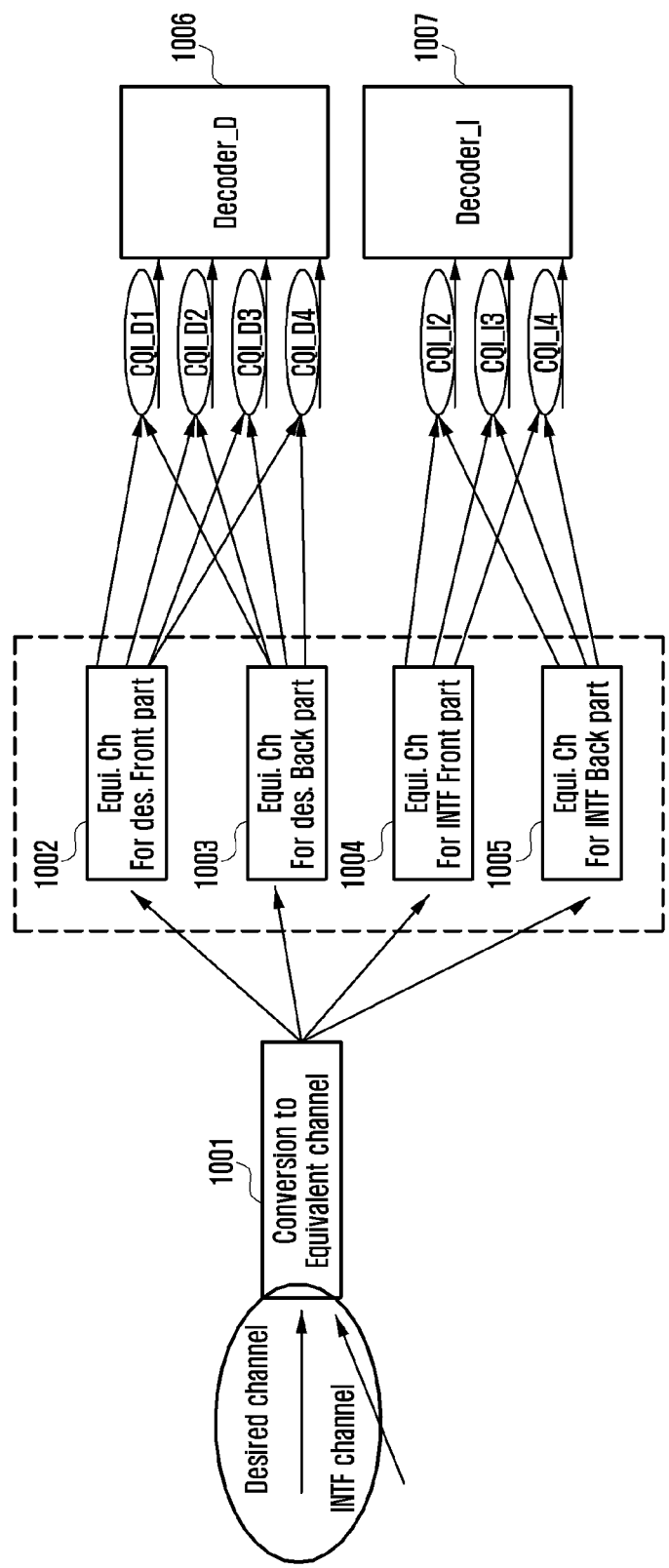
FIG. 10 is a diagram schematically illustrating a method of generating CQI pair information for a serving base station and an interference base station according to an embodiment of the present disclosure.

FIG. 10 is a diagram schematically illustrating a method of generating CQI pair information for a serving base station and an interference base station according to an embodiment of the present disclosure.

If the receiver, for example, the terminal receives the Desired channel of the serving base station signal and the INTF channel of the interference base station signal, the received channel may be converted into the equivalent channel depending on the decoding sequence as described with reference to FIGS. 9A to 9D (1001).

In association with the serving base station, a CQI may be generated using an equivalent channel of a front block 1002 including an arbitrary codeword and an equivalent channel of a back block 1003, and a plurality of CQIs (CQI_D1-D4) are generated depending on the decoding sequence. The terminal may perform decoding on data received from the serving base station based on the plurality of generated CQIs (1006).

In association with the interference base station, a CQI may be generated using an equivalent channel of a front block 1004 including an arbitrary codeword and an equivalent channel of a back block 1005, and a plurality of CQI(CQI_I2-I4) are generated depending on the decoding sequence. The terminal may perform decoding on data received from the interference base station based on the plurality of generated CQIs (1007).

Figure 11:
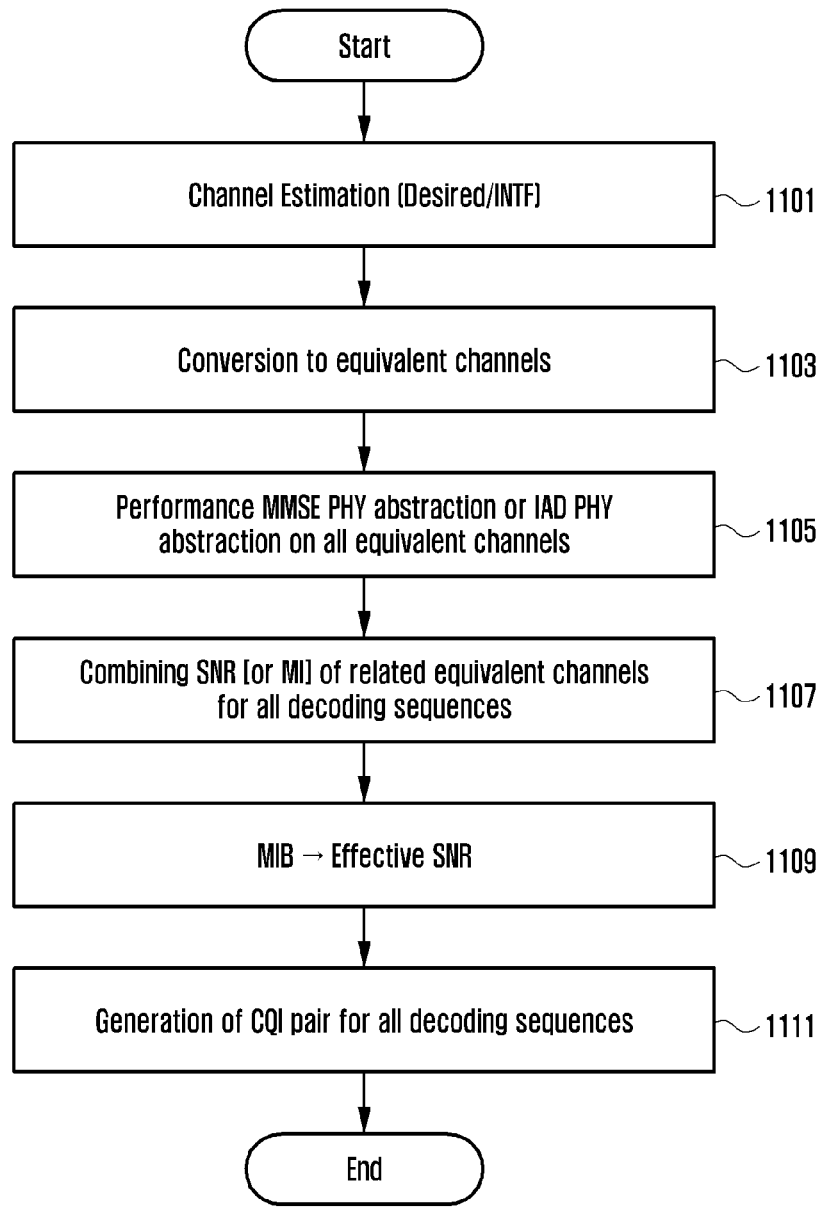
FIG. 11 is a diagram illustrating an example of a method for calculating a CQI in the condition where the sliding-window superposition coding technique according to the embodiment of the present disclosure is applied.

FIG. 11 is a flowchart illustrating an example of a process of calculating a CQI according to an embodiment of the present disclosure.

The receiver, e.g., the terminal, may perform channel estimation by receiving the serving base station signal and the interference base station signal (e.g., a reference signal) in step 1101 and convert the estimated channels into equivalent channels in step 1103. In step 1105, the receiver may perform MMSE PHY abstraction or IAD PHY abstraction on all equivalent channels. Hereinafter, the receiver may combine SNR or mutual information (MI) of the associated equivalent channels for all decoding sequences in step 1107. The receiver may acquire an effective SNR based on mutual information per bit (MIB) in step 1109 and generate the CQI pairs for all decoding sequences based on the acquired effective SNR in step 1111.

Figure 12:
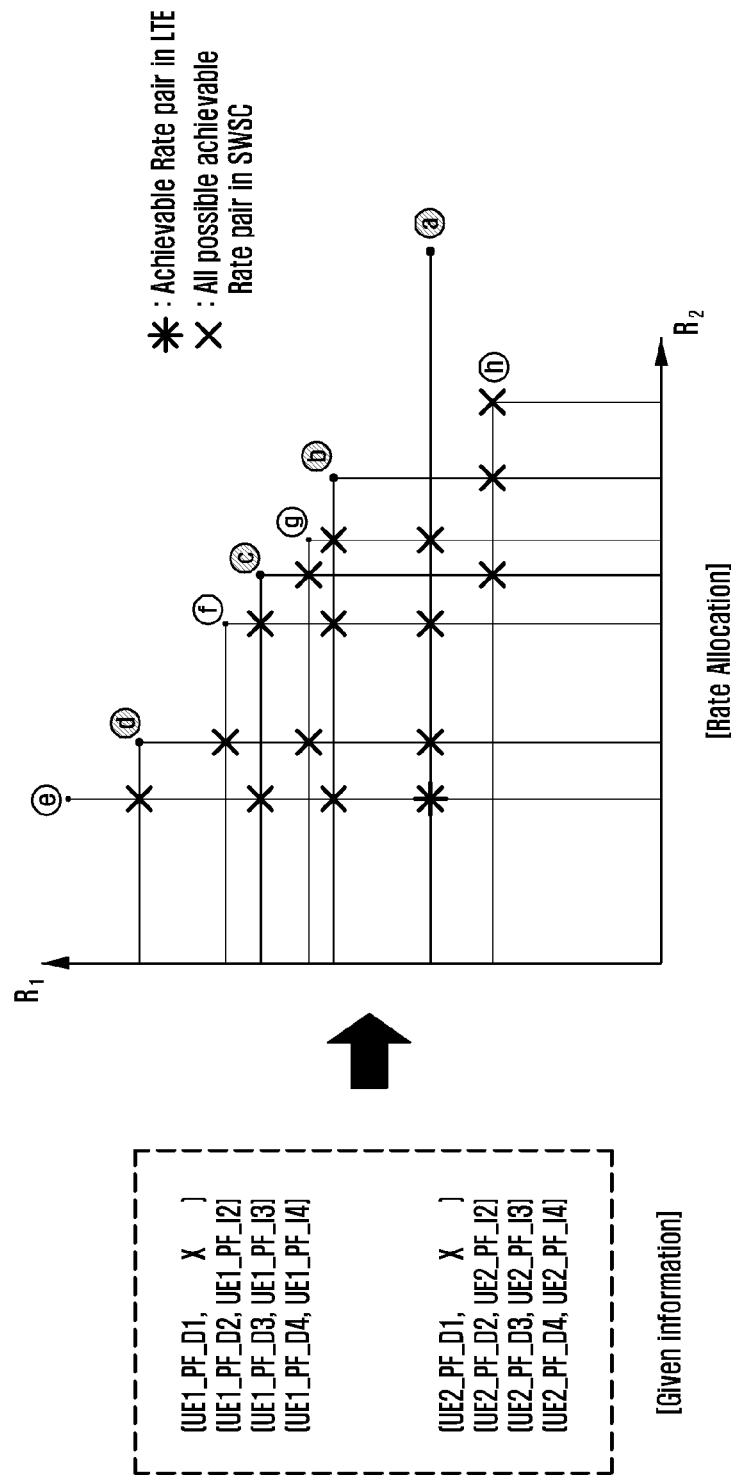
FIG. 12 is a diagram illustrating a method of allocating a modulation and coding scheme (MCS) to two terminals using CQI information received by a base station according to an embodiment of the present disclosure.

FIG. 12 is a diagram illustrating a method of allocating a modulation and coding scheme (MCS) to two terminals using CQI information received by a base station according to an embodiment of the present disclosure.

Figure 15:
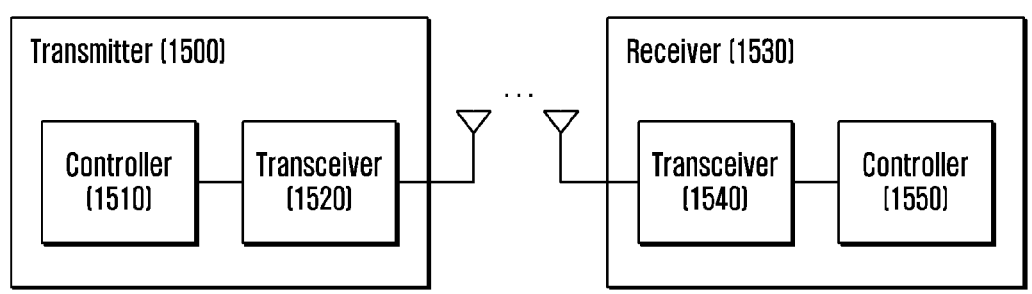
FIG. 15 is a block diagram illustrating a schematic structure of a transmitter and a receiver according to an embodiment of the present disclosure.

The receiver, for example, the base station can jointly allocate MCS to two terminals (a serving terminal and a serving terminal of an interference base station) jointly using the received CQI pair information Referring to FIG. 12, if the CQI pairs depending on the decoding sequence are acquired for two terminals, for example, the base station may check achievable rate points of a, b, c, and d in association with the serving terminal UE1 and may confirm achievable rate points of e, f, g, and h in association with a serving terminal UE2 of a neighboring base station. The achievable rate pair based on the rate points of the UE1 and the UE2 thus confirmed is as illustrated in FIG. 15. This is more variously checked than the achievable rate pair in a general LTE.

The base station may convert the CQI pairs of the two terminals UE1 and UE2 into the PF pairs in consideration of proportional fair (PF) metrics for each terminal. The MCSs of two terminals may be jointly allocated using the PF pairs of two terminals. The MCS pair that can be transmitted at the time of using the SWSC may be determined as minimum values for each component of the PF pair of the UE1 and the PF pair of the UE2. The base station may select a rate pair having the largest sum of the determined minimum values from the rate pairs depending on various decoding sequences for each terminal.

Figure 13:
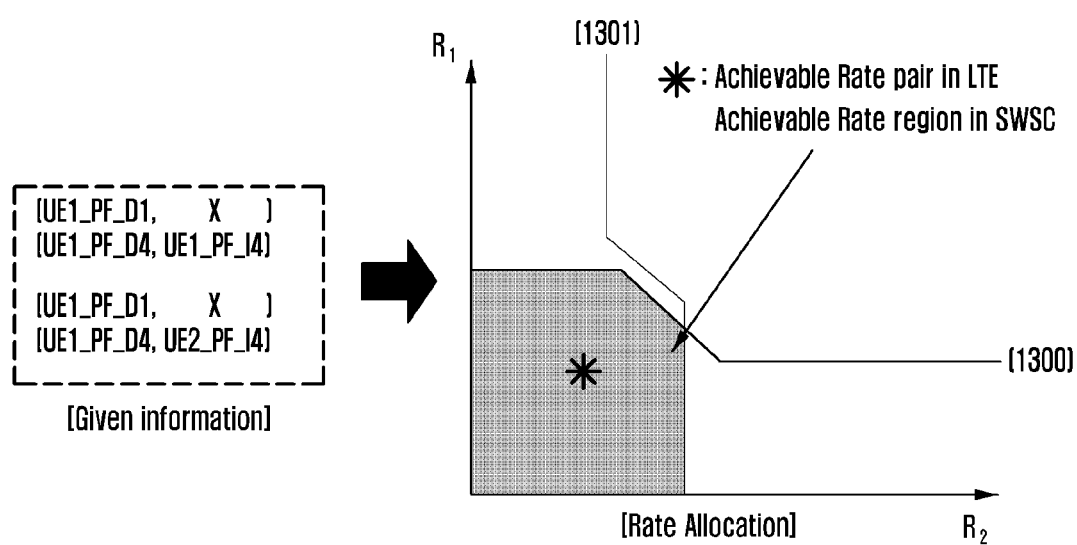
FIG. 13 is a diagram illustrating an example of information on a rate region of a terminal determined based on the CQI information according to the embodiment of the present disclosure.

FIG. 13 is a diagram illustrating an example of information on a rate region of a terminal determined based on the CQI information according to the embodiment of the present disclosure. FIG. 13 illustrates the rate region when all the CQI pair information of the two terminals UE1 and UE2 acquired by the base station is not related to the decoding sequence.

Reference numeral 1300 denotes the amount of data that the UE1 can receive with respect to data transmitted from the base station and the interference base station, which is obtained based on the CQI pair information of the UE1. Reference numeral 1301 denotes the amount of data that the UE2 can receive with respect to data transmitted from the base station and the interference base station, which is obtained based on the CQI pair information of the UE2. The regions corresponding to both of the reference numerals 1300 and 1301 are the achievable rate regions of both of the UE1 and the UE2 in the SWSC.

Figure 14:
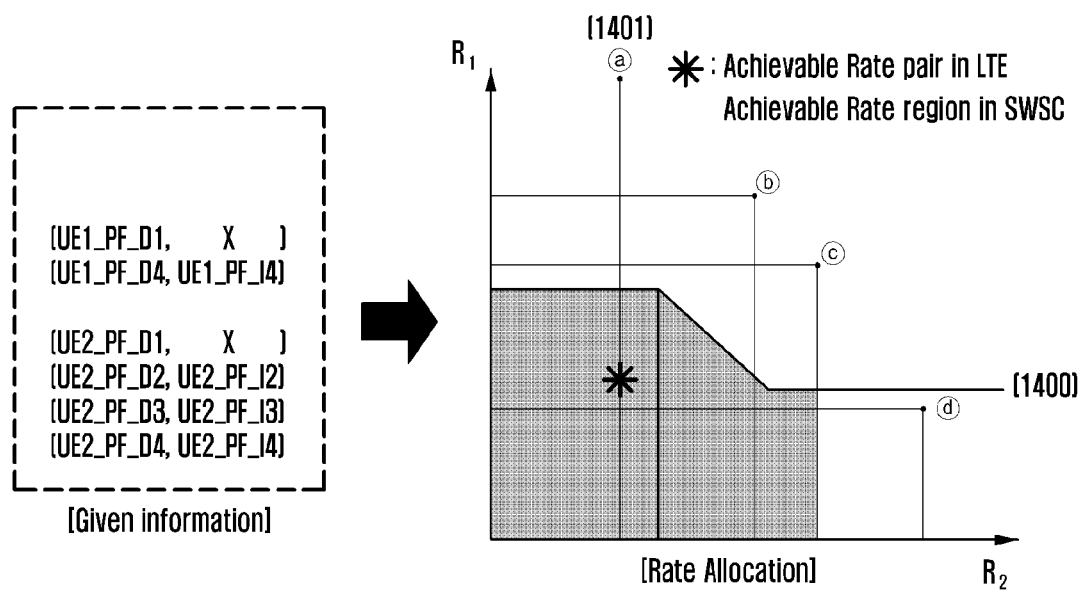
FIG. 14 is a diagram illustrating another example of the information on the rate region of the terminal determined based on the CQI information according to the embodiment of the present disclosure.

FIG. 14 is a diagram illustrating another example of the information on the rate region of the terminal determined based on the CQI information according to the embodiment of the present disclosure. FIG. 14 illustrates the rate region when one of the CQI pair information of the two terminals UE1 and UE2 acquired by the base station is not related to the decoding sequence and the rate region when the other is related to the decoding sequence.

Reference numeral 1400 denotes the amount of data that the UE1 can receive with respect to data transmitted from the base station and the interference base station, which is obtained based on the CQI pair information of the UE1. Reference numeral 1401 denotes the CQI pair information a, b, c, and d that is related to the decoding sequence of the UE2. This means the amount of data that the UE2 can receive with respect to the data transmitted by the base station and the interference base station. The regions corresponding to both of the reference numerals 1400 and 1401 are the achievable rate regions of both of the UE1 and the UE2 in the SWSC.

FIG. 15 is a block diagram illustrating a schematic structure of a transmitter 1500 and a receiver 1530 according to an embodiment of the present disclosure. The transmitter 1500 may be, for example, a base station, and the receiver 1530 may be, for example, a terminal.

The transmitter 1500 may include a controller 1510 and a transceiver 1520.

The transceiver 1520 transmits/receives a signal to/from the receiver 1530 under a control of the controller 1510

The controller 1510 may perform a control to implement an operation of the base station described in the present specification. For example, the controller 1510 applies the sliding-window superposition coding (SWSC). The controller 1510 may transmit the serving base station signal (e.g., a reference signal) for channel estimation to the terminal, receive the CQI-related information on the base station and the interference base station from the terminal, and may control the terminal to check the information on the achievable rate region of the terminal.

The receiver 1530 may include a controller 1550 and a transceiver 1540.

The transceiver 1540 transmits/receives a signal to/from the transmitted 1500 under a control of the controller 1550

The controller 1550 may perform a control to implement an operation of the terminal described in the present specification. For example, the controller 1550 may perform to estimate the channels of the serving base station and the interference base station to which the sliding-window superposition coding (SWSC) is applied, generate the channel quality information (CQI)-related information on the serving base station and the interference base station based on the estimated channel to indicate the achievable rate region, and transmit the generated CQI-related information to the serving base station.

Each of the foregoing components of the electronic device according to various embodiments of the present disclosure may be configured as one or more component and names of the corresponding components may be changed according to a kind of electronic device. Further, the electronic device according to various exemplary embodiments of the present disclosure may be configured to include at least one of the foregoing components and may not have some components or may further include other additional components. Further, some of the components of the electronic device according to various embodiments of the present disclosure are combined to be configured as one entity and thus may identically perform the functions of the corresponding components before being combined.

The terms "unit", "device", "~module" used in various embodiment of the present specification may mean a unit including one or at least two combinations of hardware, software, and firmware. The "unit", "device", or "module" may be interchangeably used with the terms such as "unit", "logic", "logical block", "component", and "circuit" The "unit", "device" or "module" may be a minimum unit of components integrally configured or some thereof. The "unit", "device" or "module" may also be a minimum unit performing one or more functions or some thereof. The "unit", "device", or "module" may be implemented mechanically or electronically. For example, a "unit," "device," or "module" according to various embodiments of the present disclosure may include at least one of an application-specific integrated circuit (ASIC) chip, field-programmable gate arrays (FPGAs), and programmable-logic devices which perform any operations known or to be developed in future.

The exemplary embodiments of the present disclosure disclosed in the present specification and the accompanying drawings have been provided only as specific examples in order to help understand the present disclosure and do not limit the scope of the present disclosure. Therefore, it is to be understood that in addition to the exemplary embodiments of the present disclosure described herein, all the changed or modified forms derived from the technical spirit of the present disclosure are included in the scope of the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A channel quality information (CQI) transmission method of a terminal in a wireless communication system, comprising:
    estimating a channel associated with a serving base station and an interference base station to which sliding-window superposition coding (SWSC) is applied;
    identifying whether a signal-to-interference ratio (SIR) or an interference-to-noise ratio (INR) for the estimated channel is smaller than a reference value;
    in case that the SIR or the INR for the estimated channel is smaller than the reference value, identifying at least one CQI value for the estimated channel without considering a decoding order of the SWSC;
    in case that the SIR or the INR for the estimated channel is not smaller than the reference value, identifying a plurality of CQI values for the estimated channel, wherein each of the plurality of CQI values is identified by applying different one of a plurality of decoding orders of the SWSC;
    generating feedback information including information on the at least one CQI value or the plurality of CQI values, wherein the information is used for identifying an achievable rate region of the terminal; and
    transmitting the feedback information to the serving base station.

2. The CQI transmission method of claim 1, wherein the information on the at least one CQI value includes information on at least three values among a CQI measured for the serving base station, a CQI measured for the serving base station in consideration of an interference due to the interference base station, a CQI measured for the interference base station, a CQI measured for the interference base station in consideration of an interference due to the serving base station, and a sum rate CQI achievable when a signal of the serving base station and the interference base station are joint-decoded.

3. The CQI transmission method of claim 1, wherein the information on the plurality of CQI values includes information on a plurality of CQIs measured when each of the plurality of the decoding orders of the SWSC is applied to the serving base station and a sum rate CQI value achievable when signals of the serving base station and the interference base station are joint-decoded.

4. The CQI transmission method of claim 1, wherein the information on the plurality of CQI values includes information on a plurality of CQIs measured when each of the plurality of the decoding orders of the SWSC is applied to the serving base station and a plurality of CQI values measured when each of the plurality of decoding orders of the SWSC is applied to the interference base station.

5. A channel quality information (CQI) processing method of a base station in a wireless communication system, comprising:
    transmitting a reference signal for estimating a channel associated with the base station and an interference base station to which sliding-window superposition coding (SWSC) is applied to a terminal;
    receiving feedback information from the terminal, the feedback information including information on at least one CQI value or a plurality of CQI values for the channel, wherein the information on the at least one CQI value identified without considering a decoding order of the SWSC is included in the feedback information in case that a signal-to-interference ratio (SIR) or an interference-to-noise ratio (INR) for the estimated channel is smaller than a reference value, the information on the plurality of CQI values identified by applying different one of a plurality of decoding orders of the SWSC is included in the feedback information in case that the SIR or the INR for the estimated channel is not smaller than the reference value; and
    identifying an achievable rate region of the terminal based on the information on the at least one CQI value or the plurality of CQI values.

6. The CQI processing method of claim 5, wherein the information on the at least one CQI value includes information on at least three values among a CQI measured for the base station, a CQI measured for the base station in consideration of an interference due to the interference base station, a CQI measured for the interference base station, a CQI measured for the interference base station in consideration of an interference due to the base station, and a sum rate CQI achievable when a signal of the base station and the interference base station are joint-decoded.

7. The CQI processing method of claim 5, wherein the information on the plurality of CQI values includes information on a plurality of CQIs measured when each of the plurality of the decoding orders of the SWSC is applied to the base station and a sum rate CQI value achievable when the signals of the base station and the interference base station are joint-decoded.

8. The CQI processing method of claim 5, wherein the information on the plurality of CQI values includes information on a plurality of CQIs measured when each of the plurality of the decoding orders of the SWSC is applied to the base station and a plurality of CQI values measured when each of the plurality of decoding orders of the SWSC is applied to the interference base station.

9. A terminal in a wireless communication system, comprising:
    a transceiver transmitting and receiving a signal; and
    a controller coupled with the transceiver and configured to:
    estimate a channel associated with a serving base station and an interference base station to which sliding-window superposition coding (SWSC) is applied,
    identify whether a signal-to-interference ratio (SIR) or an interference-to-noise ratio (INR) for the estimated channel is smaller than a reference value,
    in case that the SIR or the INR for the estimated channel is smaller than the reference value, identify at least one channel quality information (CQI) value for the estimated channel without considering a decoding order of the SWSC,
    in case that the SIR or the INR for the estimated channel is not smaller than the reference value, identify a plurality of CQI values for the estimated channel, wherein each of the plurality of CQI values is identified by applying different one of a plurality of decoding orders of the SWSC,
    generate feedback information including information on the at least one CQI value or the plurality of CQI values, wherein the information is used for identifying an achievable rate region of the terminal, and control the transceiver to transmit the feedback information to the serving base station.

10. The terminal of claim 9, wherein the information on the at least one CQI value includes information on at least three values among a CQI measured for the serving base station, a CQI measured for the serving base station in consideration of an interference due to the interference base station, a CQI measured for the interference base station, a CQI measured for the interference base station in consideration of an interference due to the serving base station, and a sum rate CQI achievable when a signal of the serving base station and the interference base station are joint-decoded.

11. The terminal of claim 9, wherein the information on the plurality of CQI values includes information on a plurality of CQIs measured when each of the plurality of the decoding orders of the SWSC is applied to the serving base station and a sum rate CQI value achievable when signals of the serving base station and the interference base station are joint-decoded.

12. The terminal of claim 9, the information on the plurality of CQI values includes information on a plurality of CQIs measured when each of the plurality of the decoding orders of the SWSC is applied to the serving base station and a plurality of CQI values measured when each of the plurality of decoding orders of the SWSC is applied to the interference base station.

13. A base station in a wireless communication system, comprising:
a transceiver transmitting and receiving a signal; and
a controller coupled with the transceiver and configured to:
control the transceiver to transmit a reference signal for estimating a channel associated with the base station and an interference base station to which sliding-window superposition coding (SWSC) is applied to a terminal,
control the transceiver to receive feedback information from the terminal, the feedback information including information on at least one channel quality information (CQI) value or a plurality of CQI values for the channel wherein the information on the at least one CQI value identified without considering a decoding order of the SWSC is included in the feedback information in case that a signal-to-interference ratio (SIR) or an interference-to-noise ratio (INR) for the estimated channel is smaller than a reference value, the information on the plurality of CQI values identified by applying different one of a plurality of decoding orders of the SWSC is included in the feedback information in case that the SIR or the INR for the estimated channel is not smaller than the reference value, and
identify an achievable rate region of the terminal based on the information on the at least one CQI value or the plurality of CQI values.

14. The base station of claim 13, wherein the information on the at least one CQI value includes information on at least three values among a CQI measured for the base station, a CQI measured for the base station in consideration of an interference due to the interference base station, a CQI measured for the interference base station, a CQI measured for the interference base station in consideration of an interference due to the base station, and a sum rate CQI achievable when a signal of the base station and the interference base station are joint-decoded.

15. The base station of claim 13, wherein the information on the plurality of CQI values includes information on a plurality of CQIs measured when each of the plurality of the decoding orders of the SWSC is applied to the base station and a sum rate CQI value achievable when the signals of the base station and the interference base station are joint-decoded.

16. The base station of claim 13, wherein the information on the plurality of CQI values includes information on a plurality of CQIs measured when each of the plurality of the decoding orders of the SWSC is applied to the base station and a plurality of CQI values measured when each of the plurality of decoding orders of the SWSC is applied to the interference base station.

* * * * *